United States Patent
Iizuka et al.

(10) Patent No.: US 10,662,963 B2
(45) Date of Patent: May 26, 2020

(54) ROTARY MACHINE

(71) Applicant: IHI Corporation, Koto-ku (JP)

(72) Inventors: Kuniaki Iizuka, Koto-ku (JP); Takashi Yoshida, Koto-ku (JP); Yuji Sasaki, Koto-ku (JP); Tatsumi Inomata, Koto-ku (JP); Takuya Ozasa, Koto-ku (JP); Ryosuke Yumoto, Koto-ku (JP); Takashi Mori, Koto-ku (JP)

(73) Assignee: IHI Corporation, Koto-ku (JP)

( * ) Notice: Subject to any disclaimer, the term of this patent is extended or adjusted under 35 U.S.C. 154(b) by 0 days.

(21) Appl. No.: 16/325,579

(22) PCT Filed: Aug. 25, 2017

(86) PCT No.: PCT/JP2017/030558
§ 371 (c)(1),
(2) Date: Feb. 14, 2019

(87) PCT Pub. No.: WO2018/043338
PCT Pub. Date: Mar. 8, 2018

(65) Prior Publication Data
US 2019/0178257 A1  Jun. 13, 2019

(30) Foreign Application Priority Data

Sep. 1, 2016 (JP) .................... 2016-171001

(51) Int. Cl.
*F04D 29/05* (2006.01)
*F16C 19/06* (2006.01)
(Continued)

(52) U.S. Cl.
CPC ......... *F04D 29/059* (2013.01); *F04D 29/056* (2013.01); *F16C 19/04* (2013.01);
(Continued)

(58) Field of Classification Search
CPC ........ F16C 19/04; F16C 33/58; F16C 35/077; F16C 19/06; F16C 2226/76; F04D 29/056; F04D 29/059; H02K 7/083
See application file for complete search history.

(56) References Cited

U.S. PATENT DOCUMENTS 4,046,432 A * 9/1977 Hofmann .............. F16C 35/067
384/510
5,899,574 A * 5/1999 Chujo .................. F16C 25/083
384/518

(Continued)

FOREIGN PATENT DOCUMENTS

CN   102359499 A   2/2012
CN   104819216 A   8/2015
(Continued)

OTHER PUBLICATIONS

International Search Report dated Oct. 3, 2017 in PCT/JP2017/030558, 2 pages.

*Primary Examiner* — Alan B Waits
(74) *Attorney, Agent, or Firm* — Oblon, McClelland, Maier & Neustadt, L.L.P.

(57) ABSTRACT

A rotary machine is provided with: a bearing that supports a rotary shaft of an impeller; a bearing support part that supports an outer circumference of the bearing; a key groove that is formed in the bearing and the bearing support part and extends along a rotary shaft line direction of the rotary shaft; and a key member that is inserted into the key groove. The bearing support part is provided with an outer regulating part that can contact one end part of the key member inside the key groove. An outer ring of the bearing is provided with an inner regulating part that can contact another end part of the key member inside the key groove. A distance between the
(Continued)

outer regulating part and the inner regulating part is longer than a length of the key member in the rotary shaft line direction.

7 Claims, 7 Drawing Sheets

(51) Int. Cl.

| | | |
|---|---|---|
| *F16C 33/58* | (2006.01) | |
| *F16C 35/07* | (2006.01) | |
| *F04D 29/059* | (2006.01) | |
| *F16C 35/077* | (2006.01) | |
| *F04D 29/056* | (2006.01) | |
| *F16C 19/04* | (2006.01) | |
| *H02K 7/08* | (2006.01) | |

(52) U.S. Cl.
CPC ............ *F16C 19/06* (2013.01); *F16C 33/58* (2013.01); *F16C 35/077* (2013.01); *H02K 7/083* (2013.01)

(56) References Cited

U.S. PATENT DOCUMENTS

| | | | |
|---|---|---|---|
| 6,250,815 B1* | 6/2001 | Picone | F16C 19/525 |
| | | | 384/557 |
| 6,834,999 B2* | 12/2004 | Kim | F16C 17/22 |
| | | | 384/278 |
| 10,415,644 B2* | 9/2019 | Iizuka | F16C 35/077 |
| 2003/0002762 A1 | 1/2003 | Kamura et al. | |
| 2017/0082115 A1* | 3/2017 | Oshita | F02B 33/40 |

FOREIGN PATENT DOCUMENTS

| | | |
|---|---|---|
| JP | 63-35818 U | 3/1988 |
| JP | 4-62418 U | 5/1992 |
| JP | 6-32749 U | 4/1994 |
| JP | 2003-13981 A | 1/2003 |
| JP | 2006-194418 A | 7/2006 |
| JP | 2010-48301 A | 3/2010 |
| JP | 2011-052550 A | 3/2011 |
| JP | 2014-105732 A | 6/2014 |
| JP | 2014-152923 A | 8/2014 |
| JP | 2015-7451 A | 1/2015 |
| JP | 2016-056828 A | 4/2016 |

* cited by examiner

ROTARY MACHINE

TECHNICAL FIELD

The present disclosure relates to a rotary machine provided with a bearing supporting a rotary shaft of an impeller.

BACKGROUND ART

Known is a bearing device provided with an anti-rotation mechanism preventing rotation of an outer ring of a bearing. As an example, Patent Literature 1 discloses an anti-rotation mechanism having a long hole reaching the radial middle of an outer ring through a housing supporting the outer ring with a pin inserted in the long hole. Patent Literature 2 and Patent Literature 3 each discloses a bearing device provided with an anti-rotation mechanism inserting a key member in a rotary shaft line direction.

CITATION LIST

Patent Literature

Patent Literature 1: Japanese Unexamined Patent Publication No. 2014-152923
Patent Literature 2: Japanese Unexamined Patent Publication No. 2010-48301
Patent Literature 3: Japanese Unexamined Patent Publication No. 2006-194418

SUMMARY OF INVENTION

Technical Problem

In a case where the bearing device described in Patent Literature 1 is applied to a rotary machine, for example, the force of thermal expansion of the rotary shaft acting on the bearing device increases depending on temperature conditions during use. As a result, the pin may be overloaded via the outer ring to cause inconvenience. On the other hand, in the bearing device described in Patent Literature 2 or 3, a problem arises in that the key member has an open end part and there is a possibility that the anti-rotation function may become unstable depending on the mode of use.

The present disclosure describes a rotary machine capable of eliminating the impact of thermal expansion of a rotary shaft while stably preventing rotation of an outer ring to follow rotation of an inner ring of a bearing.

Solution to Problem

An aspect of the present disclosure relates to a rotary machine including a bearing supporting a rotary shaft of an impeller, a bearing support part supporting an outer circumference of the bearing, a key groove formed in the bearing and the bearing support part and extending along a rotary shaft line direction of the rotary shaft, and a key member inserted into the key groove. The bearing includes an inner ring attached to the rotary shaft, an outer ring supported by the bearing support part, and a rolling element interposed between the inner ring and the outer ring. The bearing support part includes an outer regulating part capable of contacting one end part of the key member inserted in the key groove in the rotary shaft line direction. The outer ring has an inner regulating part capable of contacting another end part of the key member inserted in the key groove. A distance between the outer regulating part and the inner regulating part is longer than a length of the key member in the rotary shaft line direction.

Effects of Invention

According to several aspects of the present disclosure, it is possible to eliminate the impact of thermal expansion of a rotary shaft while stably preventing rotation of an outer ring to follow rotation of an inner ring of a bearing.

BRIEF DESCRIPTION OF DRAWINGS

FIG. 3 is a diagram illustrating a relationship between a key member and a key groove, in which
FIG. 3(a) is a cross-sectional view taken along line III(a)-III(a) of FIG. 2
and FIG. 3(b) is a cross-sectional view taken along line III(b)-III(b) of FIG. 2.

DESCRIPTION OF EMBODIMENTS

Figure 1:
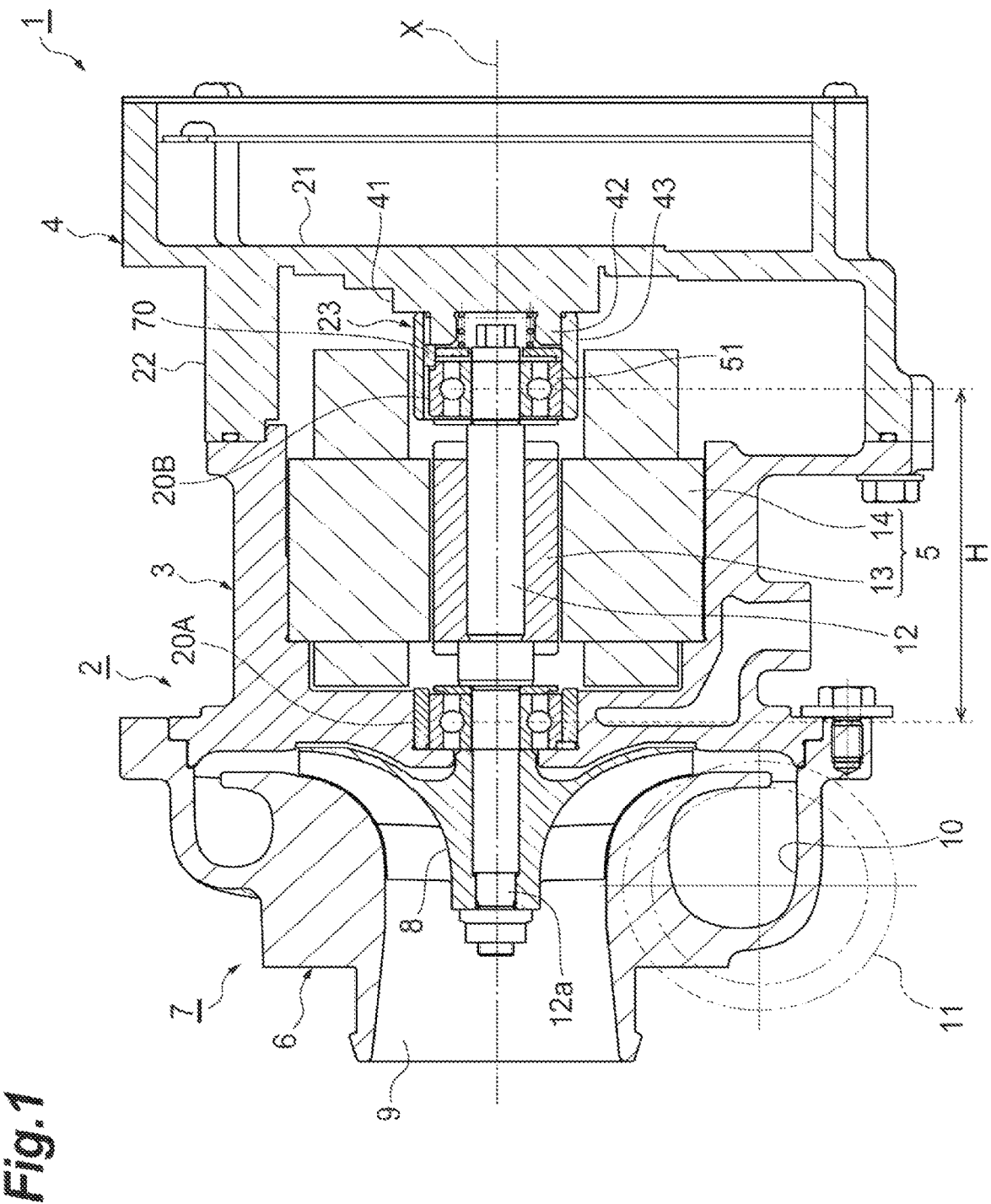
FIG. 1 is a cross-sectional view of an electric compressor according to an embodiment of the present disclosure.

Hereinafter, an embodiment of the present disclosure will be described with reference to accompanying drawings. In the description of the drawings, the same elements are denoted by the same reference numerals, and redundant description is omitted.

An aspect of the present disclosure relates to a rotary machine including a bearing supporting a rotary shaft of an impeller, a bearing support part supporting an outer circumference of the bearing, a key groove formed in the bearing and the bearing support part and extending along a rotary shaft line direction of the rotary shaft, and a key member inserted into the key groove. The bearing includes an inner ring attached to the rotary shaft, an outer ring supported by the bearing support part, and a rolling element interposed between the inner ring and the outer ring. The bearing support part includes an outer regulating part capable of contacting one end part of the key member inserted in the key groove in the rotary shaft line direction. The outer ring has an inner regulating part capable of contacting another end part of the key member inserted in the key groove. A distance between the outer regulating part and the inner regulating part is longer than a length of the key member in the rotary shaft line direction.

In this rotary machine, rotation of the outer ring can be prevented by the key member inserted in the key groove. Especially, a movement of the key member inserted in the key groove in the rotary shaft line direction is regulated by the outer regulating part of the bearing support part and the inner regulating part of the outer ring. Accordingly, in this rotary machine, it is possible to prevent falling or the like of the key member in the mode of use and to prevent rotation of the outer ring with stability. Furthermore, the distance between the outer regulating part and the inner regulating part is longer than the length of the key member in the rotary shaft line direction. Therefore, a clearance is formed between the key member and at least one of the outer regulating part and the inner regulating part, and elongation attributable to thermal expansion of the rotary shaft can be absorbed. As a result, in this rotary machine, it is possible to eliminate the impact of thermal expansion of the rotary shaft while stably preventing rotation of the outer ring to follow rotation of the inner ring of the bearing.

In the rotary machine according to several possible aspects, the key groove may include an inner groove provided in an outer circumference of the outer ring and an outer groove provided in an inner circumference of the bearing support part, and an insertion guide part adjusting a circumferential (rotational-direction) shift of the inner groove and the outer groove disposed to face each other may be provided at one or both of the end parts of the key member. The insertion guide part adjusts the circumferential shift of the inner groove and the outer groove when the key member is pre-installed in one of the inner groove and the outer groove and the key member is subsequently inserted into the other. As a result, in this aspect, workability during assembly is improved.

In several aspects, the insertion guide part may be a tapered part. The tapered part facilitates insertion into the inner groove or the outer groove, and thus circumferential shift adjustment is facilitated.

In the rotary machine according to several possible aspects, the insertion guide part may be provided at the end part on the inner regulating part side. In an exemplary procedure for assembling the bearing support part to the bearing, the key member can be temporarily fixed in the outer groove provided in the bearing support part, and the bearing support part can be assembled to the bearing in that state. Here, once the insertion guide part is provided at the end part of the key member that is on the inner regulating part side, the circumferential shift of the inner groove and the outer groove can be effectively adjusted during the assembly.

In the rotary machine according to several possible aspects, a region in which the key member fits may be larger in the outer groove than in the inner groove. An inner groove larger than the outer groove is likely to result in an increase in the size of the outer ring from the viewpoint of ensuring the strength of the bearing. In a case where the outer groove is larger than the inner groove, in contrast, an increase in the size of the outer ring of the bearing can be suppressed with ease, which is advantageous for making the entire bearing compact.

In the rotary machine according to several possible aspects, the bearing support part may include a tube part externally fitted to the outer ring, an annular presser part contacting the outer ring in the tube part, and an elastic part elastically supporting the presser part in the rotary shaft line direction, the presser part may have a avoidance part avoiding the key member in the tube part, and a avoidance region formed by an inner circumference of the tube part and the avoidance part may have a clearance in a circumferential direction of the rotary shaft with respect to the key member. By means of the avoidance region having the clearance in the circumferential direction of the rotary shaft with respect to the key member, the key member is unlikely to become a hindrance when the presser part is mounted in the tube part, and thus mountability is improved.

In several aspects, the avoidance region may have an arcuate shape. The arcuate shape facilitates processing and leads to processability improvement.

In the rotary machine according to several possible aspects, the key groove may include an inner groove provided in an outer circumference of the outer ring and an outer groove provided in an inner circumference of the bearing support part, the outer groove may have a wide width on a back side in a radial direction, and the key member may include a fall prevention part fitting in the outer groove and projecting in a width direction orthogonal to a longitudinal direction of the outer groove. In a case where, for example, the key member is temporarily fixed in the outer groove provided in the bearing support part and the bearing support part is assembled to the bearing in this state, the key member is prevented from falling, and thus assembly workability is improved. The back side in the radial direction of the outer groove means the centrifugal direction side with respect to the rotary shaft.

An electric compressor (example of a rotary machine) 1 according to one embodiment will be described with reference to FIG. 1. As illustrated in FIG. 1, the electric compressor 1 is applied to, for example, an internal combustion engine of a vehicle or a ship. The electric compressor 1 is provided with a compressor part 7. The electric compressor 1 rotates a compressor impeller (example of an impeller) 8 by means of an interaction between a rotor part 13 and a stator part 14 to compress a fluid such as air and generate compressed air. A motor 5 is formed by the rotor part 13 and the stator part 14.

The electric compressor 1 includes a rotary shaft 12 rotatably supported in a housing 2 and the compressor impeller 8 fixed to a tip part (one end part) 12*a* of the rotary shaft 12. The housing 2 includes a motor housing 3 receiving the motor 5 (rotor part 13 and stator part 14) and an inverter housing 4 closing an opening on the other end side (right side in the drawing) of the motor housing 3. A compressor housing 6 receiving the compressor impeller 8 is provided on one end side (left side in the drawing) of the motor housing 3. The compressor housing 6 includes a suction port 9, a scroll part 10, and a discharge port 11. Although aluminum is preferable for the motor housing 3 and the inverter housing 4 because aluminum is advantageous for weight reduction, for example, stainless steel or carbon steel can also be adopted.

The rotor part 13 is fixed to the middle part of the rotary shaft 12 in a rotary shaft line X direction and includes one or a plurality of permanent magnets (not illustrated) attached to the rotary shaft 12. The stator part 14 is fixed to the inner surface of the motor housing 3 so as to surround the rotor part 13 and includes a coil part (not illustrated) around which a conductor wire is wound. Once an alternating current flows to the coil part of the stator part 14 through the conductor wire, the rotary shaft 12 and the compressor impeller 8 are rotated together by the interaction between the rotor part 13 and the stator part 14. As the compressor impeller 8 rotates, the compressor impeller 8 suctions outside air through the suction port 9, compresses the air through the scroll part 10, and discharges the air from the discharge port 11. The compressed air discharged from the discharge port 11 is supplied to the aforementioned internal combustion engine.

The electric compressor 1 has two bearings 20A and 20B rotatably supporting the rotary shaft 12 with respect to the housing 2. The bearings 20A and 20B are disposed so as to sandwich the motor 5 and support the rotary shaft 12 from both sides. The bearing 20A is provided at the end part of the motor housing 3 on the compressor impeller 8 side. The other bearing 20B is attached to a support wall part 23 on the inverter housing 4 side. The support wall part 23 protrudes inwards from the inverter housing 4.

The inverter housing 4 has a mechanism for supplying a driving current to the stator part 14. The inverter housing 4 includes a disc-shaped end wall part 21 closing the opening on the other end side of the motor housing 3 and a circumferential wall part 22 connecting the outer circumferential part of the end wall part 21 and the motor housing 3. The conductor wire connected to the stator part 14 is accommodated in the circumferential wall part 22. The end wall part 21 is made of, for example, aluminum.

Figure 2:
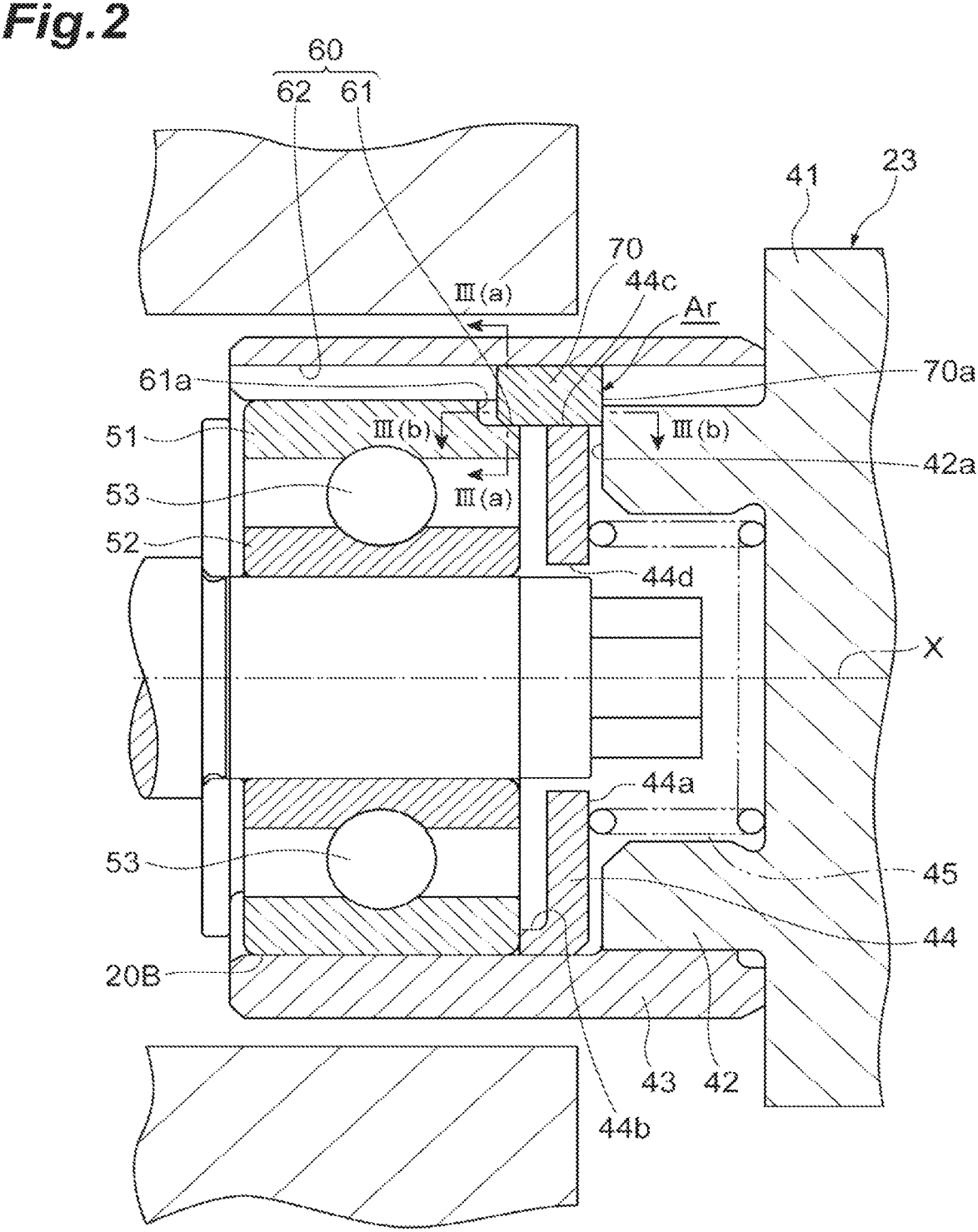
FIG. 2 is an enlarged cross-sectional view of a bearing illustrated in FIG. 1.

As illustrated in FIG. 2, the support wall part (example of a bearing support part) 23 is provided with a pedestal part 41 protruding from the middle of the end wall part 21 to the inner side in the rotary shaft line X direction, that is, to the motor 5 side (left side of the end wall part 21 illustrated in FIG. 1), a tubular sleeve receiver 42 protruding further inwards from the pedestal part 41, and a sleeve (example of a tube part) 43 externally fitted to the sleeve receiver 42. Here, the sleeve 43 is integrated with the sleeve receiver 42, for example, by press-fitting, screw fastening, or the like. An outer ring 51 of the bearing 20B is fitted in and in contact with the sleeve 43. In addition, the support wall part 23 is provided with an annular presser plate (example of a presser part) 44 contacting the outer ring 51 of the bearing 20B in the sleeve 43 and a coil spring (example of an elastic part) 45 disposed between the pedestal part 41 and the presser plate 44 in the sleeve receiver 42 and pressing the presser plate 44 against the outer ring 51. In the present embodiment, the sleeve 43 and the sleeve receiver 42 are formed as separate members. The sleeve 43 and the sleeve receiver 42 may be integrated as well.

The bearing 20B is a ball bearing provided with an inner ring 52 attached to the rotary shaft 12, for example, by press-fitting or fitting with a clearance, the above-described outer ring 51, and a rolling element 53 interposed between the inner ring 52 and the outer ring 51. The bearing 20B is supported by the support wall part 23 via the sleeve 43. The inner ring 52 rotates to follow rotation of the rotary shaft 12. Here, with respect to the outer ring 51, rotation to follow rotation of the inner ring 52 needs to be prevented. The rotary shaft 12 is made of metal such as an SCM material, thermally expands depending on temperature conditions, and elongates in the rotary shaft line X direction. Then, the bearing 20B also moves (shifts) to follow the elongation of the rotary shaft 12, and thus play that is capable of absorbing this shift is also necessary. Hereinafter, a structure that is capable of regulating rotation of the outer ring 51 and absorbing a shift equivalent to elongation attributable to thermal expansion of the rotary shaft 12 will be described in detail.

Figure 5:
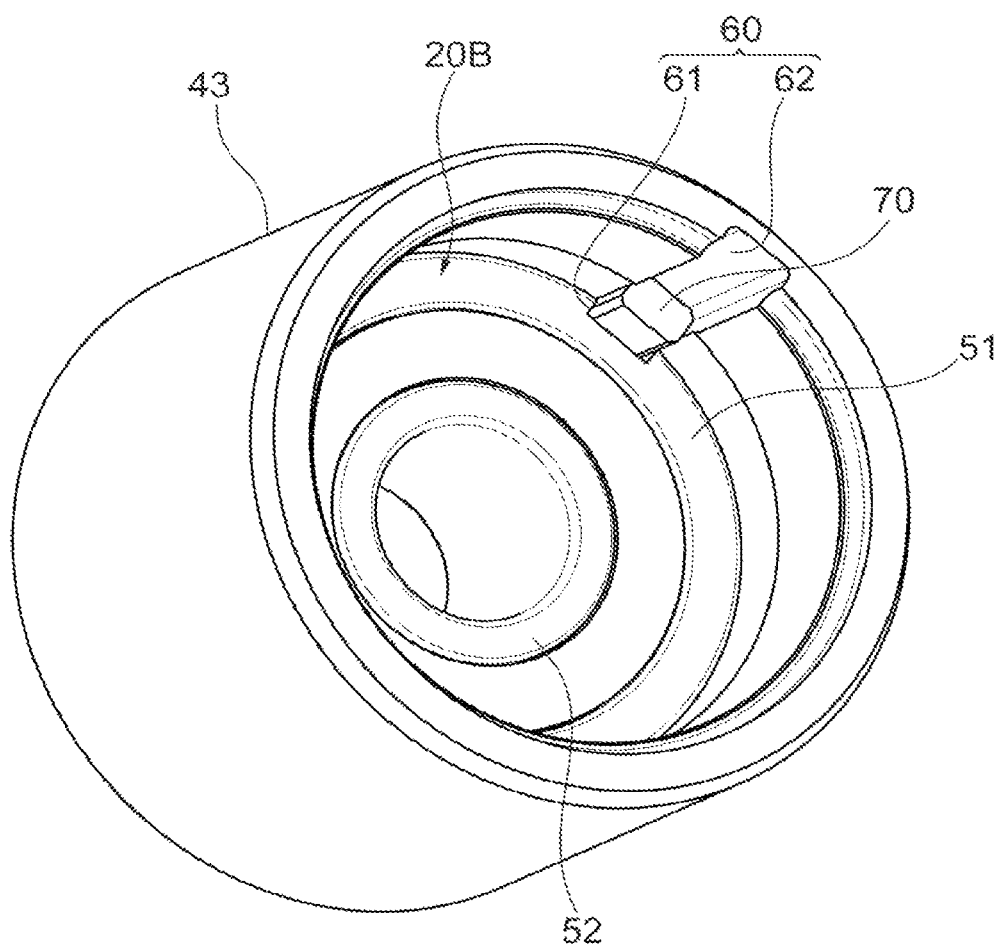
FIG. 5 is a perspective view illustrating a sleeve externally fitted to an outer ring of the bearing.

As illustrated in FIGS. 2 and 5, relative rotation of the outer ring 51 and the sleeve 43 is regulated by a key member 70 inserted into a key groove 60. The key groove 60 extends along the rotary shaft line X of the rotary shaft 12, and the key member 70 is a substantially rectangular block body inserted into the key groove 60. With the key member 70 inserted in the key groove 60, a rotational-direction movement of the key member 70 is regulated while a movement of the key member 70 in the rotary shaft line X direction is slightly allowed.

Figure 3:
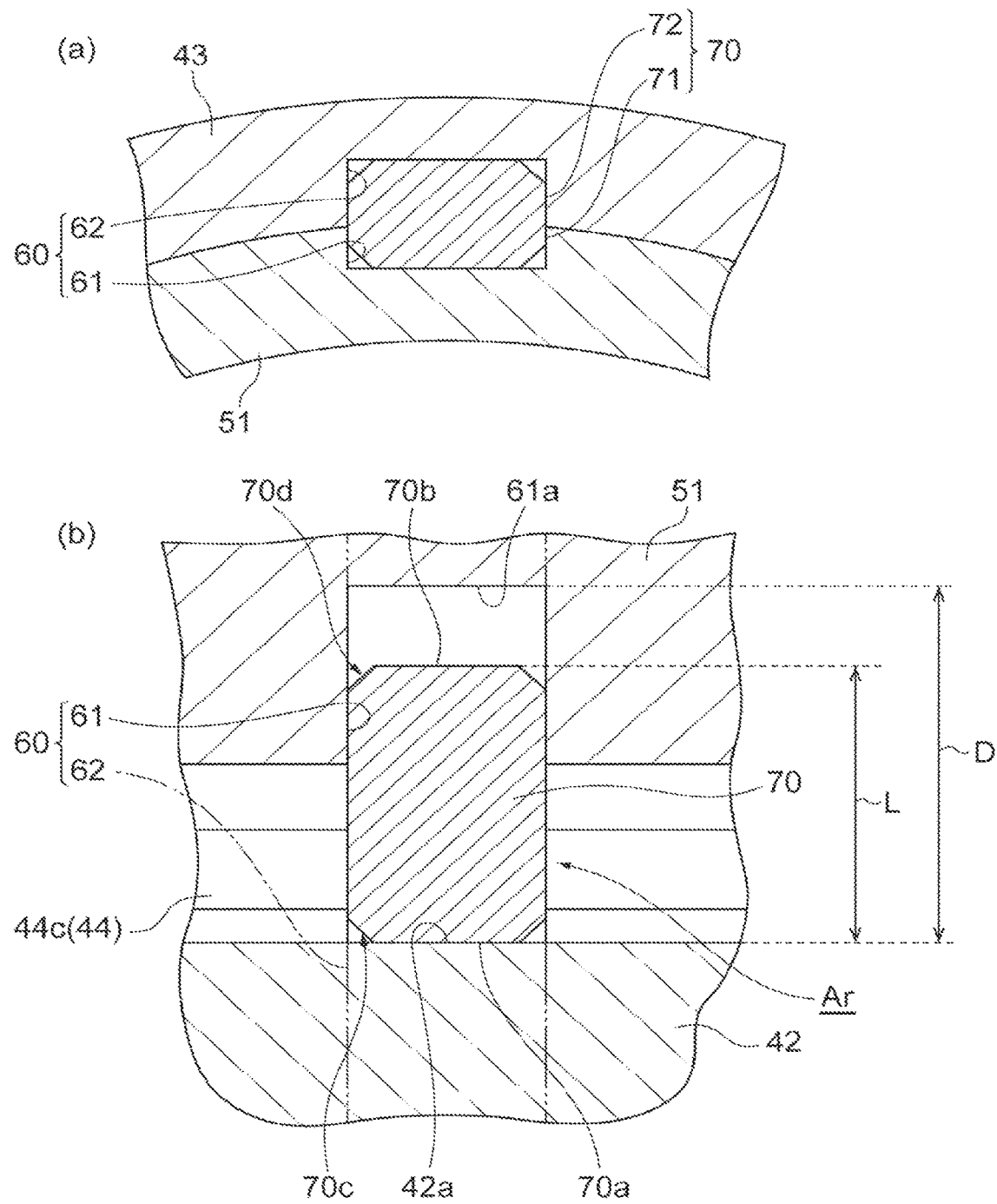
Figure 4:
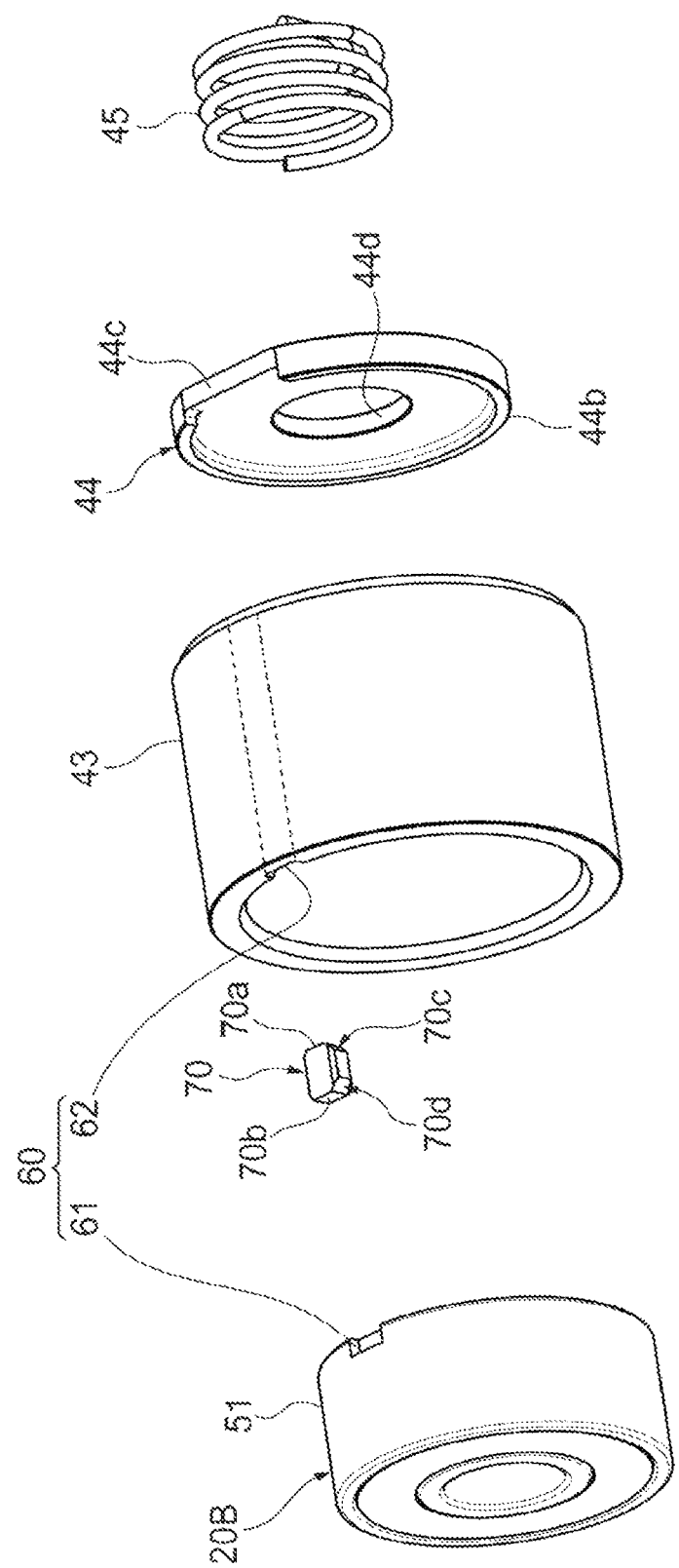
FIG. 4 is an exploded perspective view illustrating a state where the bearing and a bearing support part are assembled.

As illustrated in FIGS. 3 and 4, the key groove 60 includes an inner groove 61 provided in the outer circumference of the outer ring 51 and an outer groove 62 provided in the inner circumference of the sleeve 43. Here, one of both end parts of the outer ring 51 along the rotary shaft line X direction is an end part on a side that fits in the sleeve 43, and the other end part is an end part on the opposite side along the rotary shaft line X direction. In other words, one end part of the outer ring 51 is an end part on the side opposite to the compressor impeller 8 (end part on the right side in FIG. 1), and the other end part is an end part on the compressor impeller 8 side (end part on the left side in FIG. 1). In this case, the inner groove 61 is formed so as to cut out a part of one end part of the outer ring 51. The width of the inner groove 61, that is, the dimension in a direction orthogonal to the rotary shaft line X corresponds to the width of the key member 70. In other words, the width of the inner groove 61 is a width at which the key member 70 fits and a rotational-direction movement of the key member 70 can be regulated. In addition, the length of the inner groove 61, that is, the dimension in a direction along the rotary shaft line X may be a length at which a part of the key member 70 in the longitudinal direction (rotary shaft line X direction) fits.

The outer groove 62 is provided in the inner circumference of the sleeve 43 and extends along the rotary shaft line X. Further, the outer groove 62 traverses the inner circumference of the sleeve 43 for linear communication from the end part on the side where the bearing 20B is inserted in the inner circumference of the sleeve 43 to the end part on the opposite side. The width of the outer groove 62 corresponds to the width of the key member 70, and is a width at which the key member 70 fits and a rotational-direction movement of the key member 70 can be regulated. The length of the outer groove 62 substantially coincides with the length of the sleeve 43 along the rotary shaft line X. Further, for example, the depth of the outer groove 62 is deeper than the depth of the inner groove 61.

The inner groove 61 and the outer groove 62 overlap each other, and one key groove 60 is formed by the inner groove 61 and the outer groove 62 being combined with each other. The key member 70 inserted into the key groove 60 is provided with an inside interference part 71 close to the rotary shaft 12 and an outside interference part 72 on the opposite side (see FIG. 3(a)). The entire outside interference part 72 fits in the outer groove 62 in a direction along the rotary shaft line X (longitudinal direction). On the other hand, only a part of the inside interference part 71 in the longitudinal direction fits in the inner groove 61. In other words, the region where the key member 70 fits in the key groove 60 is larger in the outer groove 62 than in the inner groove 61. Further, in the present embodiment, the depth of the outer groove 62 is deeper than the depth of the inner groove 61. In other words, the region of the key member 70 fitting in the key groove 60 is larger in the outer groove 62 than in the inner groove 61 even if the length of the inner groove 61 in the longitudinal direction is extended and the entire inside interference part 71 of the key member 70 is fitted in the inner groove 61.

In another embodiment, for example, the region of the key member 70 fitting in the key groove 60 can be larger in the inner groove 61 than in the outer groove 62, which is contrary to the present embodiment. However, an inner groove 61 larger than the outer groove 62 is likely to result in an increase in the size of the outer ring 51 from the viewpoint of ensuring the strength of the bearing 20B. In a case where the outer groove 62 is larger than the inner groove 61 as in the present embodiment, in contrast, an increase in the size of the outer ring 51 of the bearing 20B can be suppressed with ease, which is advantageous for making the entire bearing 20B compact.

Figure 6:
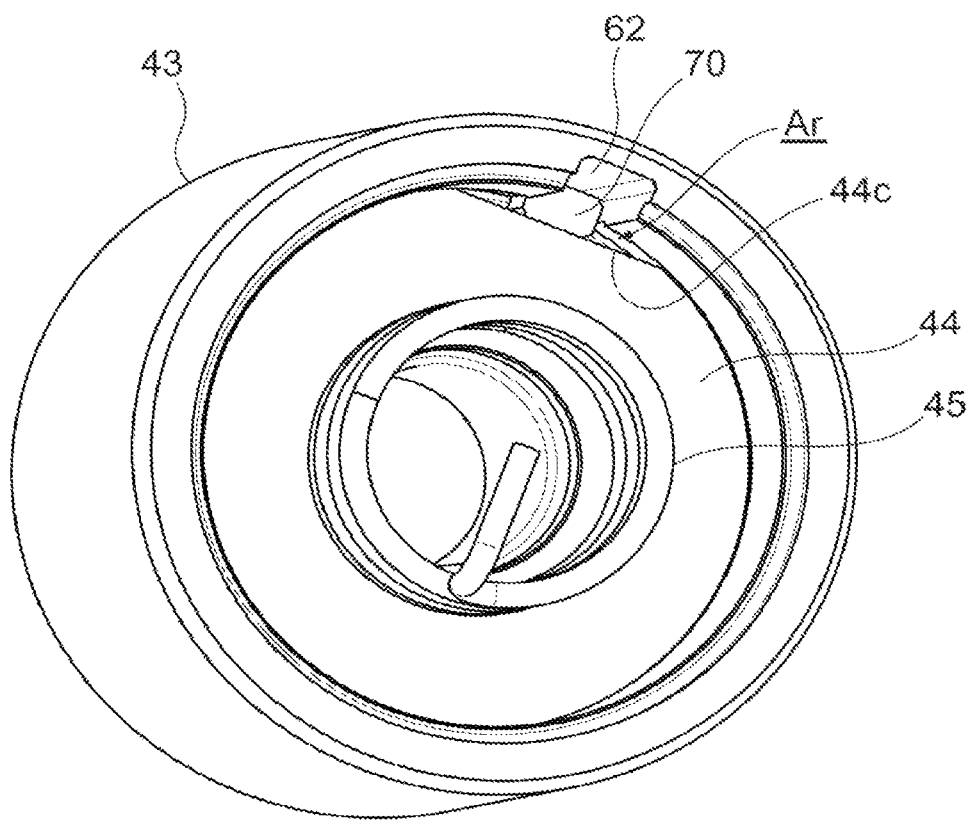
FIG. 6 is a perspective view illustrating a state where a bearing presser and a coil spring are mounted in the sleeve.

As illustrated in FIGS. 2, 4, and 6, disposed in the sleeve 43 externally fitted to the outer ring 51 are the presser plate 44 contacting the outer ring 51 and the coil spring 45 pressing the presser plate 44 toward the outer ring 51. The presser plate 44 is annular, and a center hole 44d into which an end part of the rotary shaft 12 is inserted is formed in the presser plate 44. The presser plate 44 has a spring receiving surface 44a receiving the coil spring 45. A rib 44b protruding along the outer edge is provided on a surface on a side opposite to the spring receiving surface 44a, that is, a surface facing the outer ring 51. The tip of the rib 44b contacts the outer ring 51.

The presser plate 44 is provided with a avoidance part 44c avoiding the key member 70 in the sleeve 43. The avoidance part 44c contacts the key member 70 and prevents the key member 70 from falling in cooperation with the inner groove 61. The avoidance part 44c has a shape in which, for example, a region formed by a circular arc and a string is cut away from the circular presser plate 44. As a result, an arcuate avoidance region Ar is formed between the avoidance part 44c of the presser plate 44 and the inner circumference of the sleeve 43. In other words, the "arcuate" means a part surrounded by an outline having a convex curve (circular arc) part and a linear part connecting both end parts of the convex curve part when viewed from a direction along the rotary shaft line X. The cross section of the avoidance region Ar is larger than at least the cross-sectional area of the key member 70, and particularly forms a clearance in the circumferential direction of the rotary shaft 12 with respect to the key member 70. By the avoidance region Ar being provided, the key member 70 is unlikely to become a hindrance when the presser plate 44 is mounted in the sleeve 43, and thus mountability is improved. In addition, the part of the presser plate 44 other than the avoidance region AR, that is, the part of the outer circumference of the presser plate 44 other than the avoidance part 44c extends radially outwards beyond the key member 70. Specifically, the distance from the rotary shaft line X to the part other than the avoidance part 44c is longer than the distance from the rotary shaft line X to the avoidance part 44c contacting the key member 70. As a result, when the presser plate 44 is poised to rotate, the presser plate 44 receives interference of the key member 70 and is regulated in rotation. In other words, by the avoidance region Ar being provided, rotation of the presser plate 44 relative to the key member 70 can be regulated. It should be noted that the shape of the avoidance region Ar is not limited to the arcuate shape insofar as the shape of the avoidance region Ar has any one of functions of preventing interference during mounting of the key member 70 and preventing relative rotation of the presser plate 44. However, processability is improved as compared with complex shapes when the arcuate shape is adopted. As a result, it is possible to easily form the avoidance region Ar having both functions of preventing interference with the key member 70 during mounting of the presser plate 44 and preventing rotation of the presser plate 44 relative to the key member 70.

As described above, the support wall part 23 includes the sleeve receiver 42 to which the sleeve 43 is externally fitted. The tip surface of the sleeve receiver 42 is capable of contacting, by facing, one end part 70a of the rectangular block-shaped key member 70 in the longitudinal direction (direction along the rotary shaft line X). In other words, the tip surface is an outer regulating part 42a (see FIG. 3(b)) regulating a movement of the key member 70 in a direction along the rotary shaft line X. Further, the outer ring 51 has a wall surface that closes the back side of the inner groove 61 in the rotary shaft line X direction, and this wall surface is capable of contacting, by facing, the other end part 70b of the key member 70. In other words, this wall surface is an inner regulating part 61a that regulates the direction of the key member 70 along the rotary shaft line X. The term "capable of contacting" means that contact-based movement regulation is possible in a case where the key member 70 moves in the longitudinal direction of the key groove 60 (direction along the rotary shaft line X).

A distance D between the outer regulating part 42a and the inner regulating part 61a is longer than a length L of the key member 70 in the longitudinal direction. Therefore, a clearance is formed between the key member 70 and at least one of the outer regulating part 42a and the inner regulating part 61a. Elongation attributable to thermal expansion of the rotary shaft 12 can be absorbed by this clearance. For example, elongation ΔH attributable to thermal expansion of the rotary shaft 12 is expressed by the following Equation (1).

$$\Delta H = H \times \alpha \times T \qquad (1)$$

H: Inter-bearing distance (see FIG. 1)
α: Linear expansion coefficient of rotary shaft
T: Increase in temperature of predetermined representative part (such as rotary shaft and bearing) before and after operation In the present embodiment, the difference D−L between the distance D between the outer regulating part 42a and the inner regulating part 61a and the length L of the key member 70 in the longitudinal direction is designed to be larger than the thermal expansion-based elongation ΔH calculated by the above equation. In other words, the length L and the distance D may be appropriately set so as to satisfy (distance D−length L)>ΔH=H×α×T As illustrated in FIGS. 3 and 4, the key member 70 has a substantially rectangular block shape and is inserted into the key groove 60 such that the longitudinal direction of the key member 70 is along the longitudinal direction of the key groove 60. One of both end parts of the key member 70 in the longitudinal direction is the end part 70a on the outer regulating part 42a side, and the other is the end part 70b on the inner regulating part 61a side. In the present embodiment, tapered parts 70c and 70d are formed at both the end part 70a on the outer regulating part 42a side and the end part 70b on the inner regulating part 61a side. The tapered parts 70c and 70d are examples of an insertion guide part that adjusts the circumferential shift of the inner groove 61 and the outer groove 62 disposed to face each other. It is sufficient for the insertion guide part to be capable of adjusting the circumferential shift of the inner groove 61 and the outer groove 62. Accordingly, for example, a gradient part having an inclined surface may be formed instead of the tapered parts 70c and 70d.

The significance of providing the tapered parts 70c and 70d as insertion guide parts will be described. In assembling the bearing 20B to the support wall part 23, for example, the key member 70 can be pre-installed in the outer groove 62 of the sleeve 43 by temporary fixing or the like. Subsequently, in order to attach the sleeve 43 of the support wall part 23 to the bearing 20B, the outer groove 62 and the inner groove 61 need to be aligned and one key groove 60 needs to be formed with the circumferential shift adjusted. Here, when the key member 70 temporarily fixed to the sleeve 43 is to be inserted into the inner groove 61 of the outer ring 51, the tapered part 70d of the key member 70 makes contact with the outer ring 51 to rotate the outer ring 51 and the circumferential shift of the inner groove 61 with respect to the outer groove 62 is adjusted. As a result, workability during assembly is improved.

In addition, in the key member 70 according to the present embodiment, the tapered part 70c is provided at the end part 70a on the outer regulating part 42a side as well. Accordingly, it is possible to enjoy the benefit of improving workability during assembly even in a case where the key member 70 is pre-installed in the inner groove 61 of the outer ring 51 and assembly work is carried out in the order reverse to the above. In the present embodiment, the tapered parts 70c and 70d are provided at both end parts 70a and 70b of the key member 70. Alternatively, an insertion guide part such as the tapered parts 70c and 70d may be provided at either the end part 70a or the end part 70b depending on actual assembly work processes.

Figure 7:
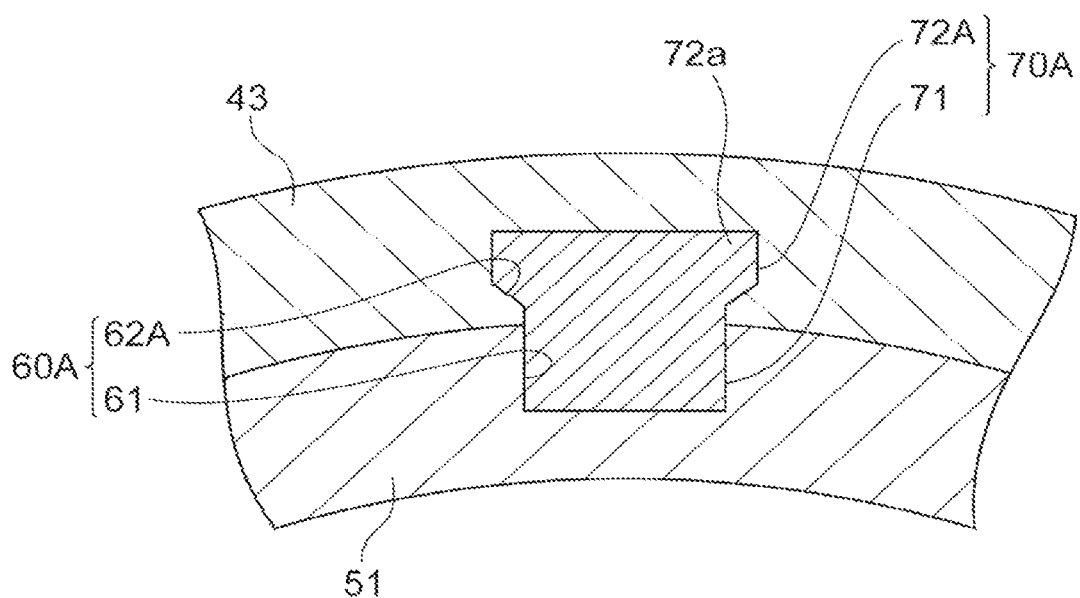
FIG. 7 is a cross-sectional view illustrating a relationship between a key member and a key groove according to a modification example.

A modification example of the key member 70 and the key groove 60 will be described below with reference to FIG. 7. In this modification example, elements and structures common to those of the key member 70 and the key groove 60 described above are denoted by the same reference numerals, and description thereof will be omitted to focus on differences.

A key groove 60A includes the inner groove 61 provided in the outer circumference of the outer ring 51 and an outer groove 62A provided in the inner circumference of the sleeve 43. The outer groove 62A has a wide width on the back side in the radial direction. Here, the back side in the radial direction means the outside in the radial direction. More specifically, the back side in the radial direction means the side away from the rotary shaft 12, that is, the centrifugal direction side with respect to the rotary shaft 12. A key member 70A includes the inside interference part 71 that fits in the inner groove 61 and an outside interference part 72A that fits in the outer groove 62. The outside interference part 72A is provided with a fall prevention part 72a that projects in the width direction orthogonal to the longitudinal direction of the outer groove 62. In a case where, for example, the key member 70A is temporarily fixed in the outer groove 62A and the support wall part 23 is assembled to the bearing 20B in that state, the key member 70 is prevented from falling by the fall prevention part 72a being caught by the sleeve 43, and thus assembly workability is improved.

As described above, in the present embodiment, rotation of the outer ring 51 can be prevented by the key member 70, 70A inserted in the key groove 60, 60A. Especially, a movement of the key member 70, 70A inserted in the key groove 60, 60A in the rotary shaft line X direction is regulated by the outer regulating part 42a of the support wall part 23 and the inner regulating part 61a of the outer ring 51. Therefore, in these embodiments, it is possible to prevent falling or the like in the mode of use and to prevent rotation of the outer ring 51 with stability. Furthermore, the distance between the outer regulating part 42a and the inner regulating part 61a is longer than the length of the key member 70 in the rotary shaft line X direction. Therefore, a clearance is formed between the key member 70 and at least one of the outer regulating part 42a and the inner regulating part 61a, and elongation attributable to thermal expansion of the rotary shaft 12 can be absorbed. As a result, in the present embodiment, it is possible to eliminate the impact of thermal expansion of the rotary shaft 12 while stably preventing rotation of the outer ring 51 to follow rotation of the inner ring 52 of the bearing 20B.

The present disclosure can be implemented in various forms including various modifications and improvements based on knowledge of those skilled in the art, including the above-described embodiments. Further, it is also possible to constitute a modified example of each embodiment by using the technical matters described in the above embodiments. The configurations of the embodiments may be combined for use as appropriate.

Further, the present disclosure can be applied to any rotary machine provided with a bearing supporting a rotary shaft. For example, the present disclosure can be applied to an electric supercharger assisting in rotation by means of a motor provided with a turbine. Also, the present disclosure can be applied to general superchargers other than the electric supercharger. Further, the present disclosure can be applied to a generator for turbine-based electric power generation as well as a rotary machine provided with a compressor. Further, the inverter housing is not limited to being axially connected to the motor housing and may also be connected radially outwards. For example, the inverter housing may be provided at the upper part of the motor housing.

REFERENCE SIGNS LIST

1: electric compressor (rotary machine), 8: compressor impeller (impeller), 12: rotary shaft, 20B: bearing, 23: support wall part (bearing support part), 42a: outer regulating part, 43: sleeve (tube part), 44: presser plate (presser part), 44c: avoidance part, 51: outer ring, 52: inner ring, 53: rolling element, 60: key groove, 61a: inner regulating part, 61: inner groove, 62: outer groove, 70: key member, 70c, 70d: tapered part (insertion guide part), 72a: fall prevention part, Ar: avoidance region, L: length of key member.

The invention claimed is:

1. A rotary machine comprising:
a bearing supporting a rotary shaft of an impeller;
a bearing support part supporting an outer circumference of the bearing;
a key groove formed in the bearing and the bearing support part and extending along a rotary shaft line direction of the rotary shaft; and
a key member inserted into the key groove, wherein
the bearing includes an inner ring attached to the rotary shaft, an outer ring supported by the bearing support part, and a rolling element interposed between the inner ring and the outer ring,
the bearing support part includes an outer regulating part capable of contacting one end part of the key member inserted in the key groove in the rotary shaft line direction,
the outer ring has an inner regulating part capable of contacting another end part of the key member inserted in the key groove,
a distance between the outer regulating part and the inner regulating part is longer than a length of the key member in the rotary shaft line direction,
the key groove includes an inner groove provided in an outer circumference of the outer ring and an outer groove provided in an inner circumference of the bearing support part, and
an insertion guide part adjusting a circumferential shift of the inner groove and the outer groove disposed to face each other is provided at one or both of the end parts of the key member.

2. The rotary machine according to claim 1, wherein the insertion guide part is a tapered part.

3. The rotary machine according to claim 1, wherein the insertion guide part is provided at the end part on the inner regulating part side.

4. The rotary machine according to claim 1, wherein a region in which the key member fits is larger in the outer groove than in the inner groove.

5. A rotary machine comprising:
a bearing supporting a rotary shaft of an impeller;
a bearing support part supporting an outer circumference of the bearing;
a key groove formed in the bearing and the bearing support part and extending along a rotary shaft line direction of the rotary shaft; and
a key member inserted into the key groove, wherein
the bearing includes an inner ring attached to the rotary shaft, an outer ring supported by the bearing support part, and a rolling element interposed between the inner ring and the outer ring,
the bearing support part includes an outer regulating part capable of contacting one end part of the key member inserted in the key groove in the rotary shaft line direction,
the outer ring has an inner regulating part capable of contacting another end part of the key member inserted in the key groove,
a distance between the outer regulating part and the inner regulating part is longer than a length of the key member in the rotary shaft line direction,
the bearing support part includes a tube part externally fitted to the outer ring, an annular presser part contacting the outer ring in the tube part, and an elastic part pressing the presser part to the outer ring side in the rotary shaft line direction,
the presser part has a avoidance part avoiding the key member in the tube part, and
an avoidance region formed by an inner circumference of the tube part and the avoidance part has a clearance in a circumferential direction of the rotary shaft with respect to the key member.

6. The rotary machine according to claim 5, wherein the avoidance region has an arcuate shape.

7. A rotary machine comprising:
a bearing supporting a rotary shaft of an impeller;
a bearing support part supporting an outer circumference of the bearing;
a key groove formed in the bearing and the bearing support part and extending along a rotary shaft line direction of the rotary shaft; and
a key member inserted into the key groove, wherein
the bearing includes an inner ring attached to the rotary shaft, an outer ring supported by the bearing support part, and a rolling element interposed between the inner ring and the outer ring,
the bearing support part includes an outer regulating part capable of contacting one end part of the key member inserted in the key groove in the rotary shaft line direction,
the outer ring has an inner regulating part capable of contacting another end part of the key member inserted in the key groove,
a distance between the outer regulating part and the inner regulating part is longer than a length of the key member in the rotary shaft line direction,
the key groove includes an inner groove provided in an outer circumference of the outer ring and an outer groove provided in an inner circumference of the bearing support part,
the outer groove has a wider width on a back side in a radial direction than the inner groove, and
the key member includes a fall prevention part fitting in the outer groove and projecting in a width direction orthogonal to a longitudinal direction of the outer groove.

\* \* \* \* \*